(12) United States Patent
Kawamoto

(10) Patent No.: US 6,434,442 B1
(45) Date of Patent: Aug. 13, 2002

(54) THREE-DIMENSIONAL SHAPE DATA PROCESSING DEVICE, CARVED PLATE AND CARVING DEVICE

(75) Inventor: Meitetsu Kawamoto, 33-10, Ebaracho 3-chome, Nakano-Ku, Tokyo 165-0023 (JP)

(73) Assignees: Meitetsu Kawamoto; Petio Co. Ltd., both of Tokyo (JP)

( * ) Notice: Subject to any disclaimer, the term of this patent is extended or adjusted under 35 U.S.C. 154(b) by 0 days.

(21) Appl. No.: 09/297,830

(22) PCT Filed: Sep. 8, 1998

(86) PCT No.: PCT/JP98/04026
§ 371 (c)(1),
(2), (4) Date: May 10, 1999

(87) PCT Pub. No.: WO99/14061
PCT Pub. Date: Mar. 25, 1999

(30) Foreign Application Priority Data

Sep. 12, 1997 (JP) .............................................. 9-248352

(51) Int. Cl.[7] .............................................. G06F 19/00
(52) U.S. Cl. .......................... 700/98; 700/118; 700/163; 700/182
(58) Field of Search .......................... 700/163, 98, 118, 700/182, 186, 187, 189

(56) References Cited

U.S. PATENT DOCUMENTS

| | | | | |
|---|---|---|---|---|
| 4,385,360 A | * | 5/1983 | Yamada et al. ............. | 358/299 |
| 5,197,013 A | * | 3/1993 | Dundorf ..................... | 700/182 |
| 5,619,625 A | * | 4/1997 | Konno et al. ............... | 345/419 |
| 5,621,648 A | * | 4/1997 | Crump ....................... | 700/112 |
| 5,926,388 A | * | 7/1999 | Kimbrough et al. ........ | 700/118 |
| 6,120,171 A | * | 9/2000 | Shaikh ....................... | 700/98 |

* cited by examiner

Primary Examiner—Leo Picard
Assistant Examiner—Ryan Jarrett
(74) Attorney, Agent, or Firm—Armstrong, Westerman & Hattori, LLP (57) ABSTRACT

A three-dimensional shape data processor for processing data concerning a three-dimensional shape to be formed on a flat plate has a synthesis processing means (5 and 6) for performing synthesis processing such that three-dimensional shape data are partially superimposed on one another, and at an overlap portion, either one of the three-dimensional shape data is left as it is, while the other is erased, and an interpolation processing means (7) for performing interpolation processing by providing a predetermined interpolation region at a boundary between the three-dimensional shape data subjected to the synthesis processing. Interpolation is performed so that the height changes continuously between the three-dimensional shape data combined together through the interpolation region. An engraving apparatus cuts a flat plate immersed in a cutting fluid, thereby preventing cuttings from depositing on a cutting blade or the plate being engraved even in the case of a noble metal. Thus, engraving quality can be improved.

6 Claims, 7 Drawing Sheets

| distance | d | d-1 | d-2 | d-3 | ------------ | 1 | 0 |
|---|---|---|---|---|---|---|---|
| compression ratio | 0.95 | 0.9 | 0.8 | 0.6 | ------------ | 0.1 | 0 |

THREE-DIMENSIONAL SHAPE DATA PROCESSING DEVICE, CARVED PLATE AND CARVING DEVICE

TECHNICAL FIELD

The present invention relates to a three-dimensional shape data processor for processing data concerning a three-dimensional shape to be formed on a flat plate. The present invention also relates to an engraved plate engraved by moving a cutting blade vertically while moving a flat plate in the directions X and Y on the basis of superimposed three-dimensional shape data. In addition, the present invention relates to an engraving apparatus for engraving a flat plate of a noble metal on the basis of three-dimensional shape data.

BACKGROUND ART

A three-dimensional shape measuring apparatus measures a three-dimensional shape having a height by using lasers and CCDs (Charge-Coupled Devices). The three-dimensional shape measuring apparatus is widely used for the purpose of making use of three-dimensional shapes in morphological researches based on the measurement of the human body and the regions of the human body and also in the field of medical treatment. As is well known, three-dimensional shape measuring apparatus are generally designed to measure the height at each point in a two-dimensional XY-plane on the principle of trigonometry. Various three-dimensional shape measuring apparatus have heretofore been proposed [for example, see Japanese Patent Application Unexamined Publication (KOKAI) Nos. 58-18110 and 60-220805]. In measurement of the hair of the human body with these conventional apparatus, a missing portion where no measurement data is obtained occurs. Therefore, the measurement accuracy is extremely low. For this reason, it has heretofore been difficult to obtain an engraved medal of good quality using three-dimensional shape measurement data concerning the head. In recent years, however, medals engraved with the pictures of the heads using three-dimensional shape measurement data have been improving in quality as the result of improvements in the measurement accuracy of three-dimensional shape measuring apparatus and improvements in interpolation and correction processing algorithms for measurement data, and automatic medal-engraving apparatus have already been proposed [for example, see Japanese Patent Application Unexamined Publication (KOKAI) No. 2-303900].

Figure 1:
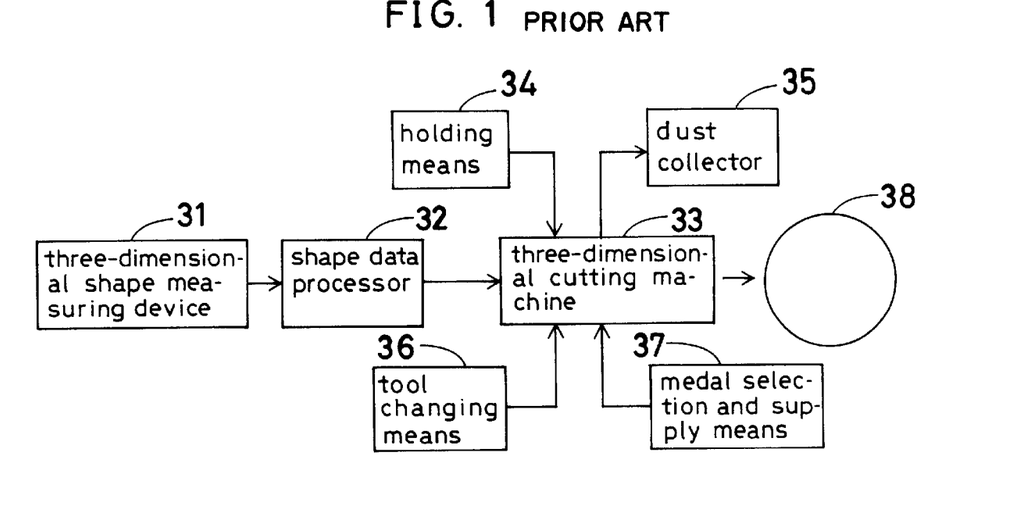
FIG. 1 is a diagram for describing a conventional automatic engraving apparatus using three-dimensional shape measurement data.
Figure 2:
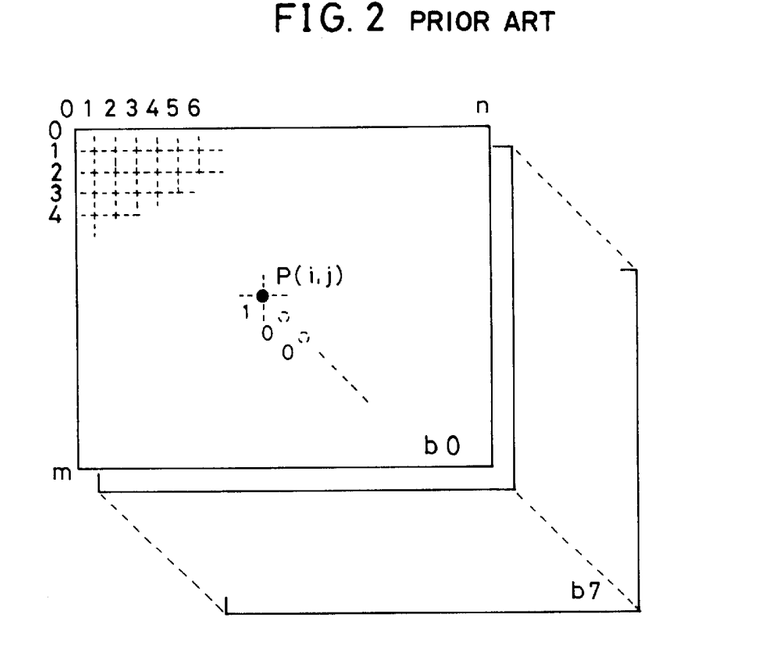
FIG. 2 is a diagram showing a configuration example of a memory space for three-dimensional shape measurement data.

FIG. 1 is a diagram for describing a conventional automatic engraving apparatus using three-dimensional shape measurement data, and FIG. 2 is a diagram showing a configuration example of a memory space for three-dimensional shape measurement data. In the figures: reference numeral 31 denotes a three-dimensional shape measuring device; 32 denotes a shape data processor; 33 denotes a three-dimensional cutting machine; 34 denotes a holding means; 35 denotes a dust collector; 36 denotes a tool changing means; 37 denotes a medal selection and supply means; and 38 denotes a medal.

In FIG. 1, the three-dimensional shape measuring device 31 is a means for three-dimensionally measuring a person's face in profile, for example. The shape data processor 32 is a computer that performs control, arithmetic processing and storage of data measured by the three-dimensional shape measuring device 31 to calculate the width, length and thickness of the person's face in profile. The three-dimensional cutting machine 33 moves a cutting tool vertically in the direction Z while moving (scanning) the medal 38 in the directions X and Y, which is an object to be engraved, on the basis of the shape data under the control of the shape data processor 32, thereby engraving one side of the medal 38 with a profile of the person. The three-dimensional cutting machine 33 is equipped with the holding means 34, the dust collector 35, the tool changing means 36 and the medal selection and supply means 37 as accessories. The holding means 34 is a vise or the like for holding firmly the medal 38. The tool changing means 36 changes cutting tools, e.g. a drill, a cutter, and an end mill, from one to another in conformity to a portion of each individual medal that is to be cut. The dust collector 35 collects cuttings in one place. The medal selection and supply means 37 has several different kinds of medals, which vary in color, size, etc., prepared in advance according to need, and transfers a medal as selected at one's desire to the cutting position.

The three-dimensional shape measuring device 31 may be one of those which use various techniques: e.g. a method wherein the height Z at each point in a two-dimensional XY-plane is measured by using two industrial television cameras and CCDs; an optical cutting method wherein a three-dimensional shape is measured by projecting an optical membrane that can be formed by a combinational system comprising a ray scanning or parallel beam magnifying lens system (beam expander) and a cylindrical lens; a moire topography method wherein a grating having slits formed at a uniform pitch is placed at a predetermined distance, and light is projected through the grating to measure a three-dimensional shape; and a method that utilizes a distorted mesh image obtained by projecting a shadow of a mesh-shaped orthogonal grating onto an object.

Three-dimensional shape data measured with such a three-dimensional shape measuring device 31 can be set in a memory space using 8 plane memories of n×m in the case of 8-bit representation of the height in an n×m two-dimensional plane as shown in FIG. 2 by way of example. Height information in the three-dimensional shape data is stored in such a manner as to skewer the plane memories at each point. Accordingly, height data at a point P (i,j), for example, is taken out in the form of "10011010" by successively reading data from the plane memories at that point. The three-dimensional cutting machine determines and controls the height of the cutting tool, that is, the cutting height, on the basis of the height data. P (i,j) is the cutting position of the medal at this time.

FIG. 3 is a diagram for describing problems arising in the case of synthesis processing of three-dimensional shape data.

Figure 3A:
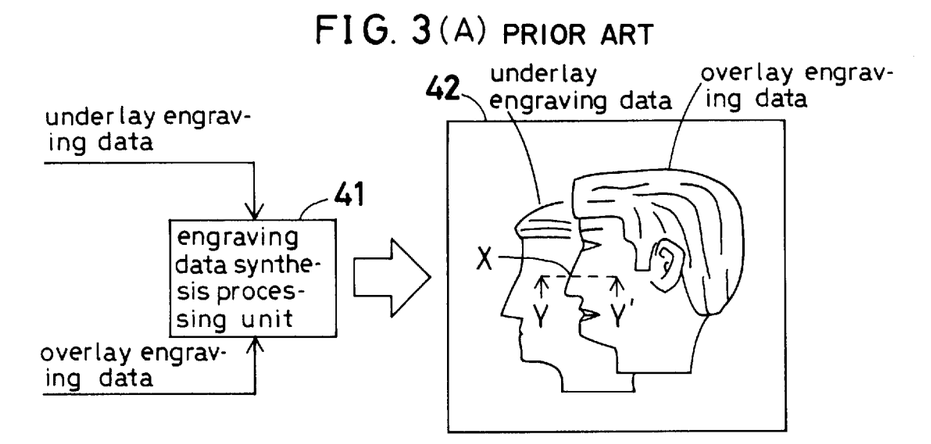
FIG. 3 is a diagram for describing problems arising in the case of synthesis processing of three-dimensional shape data.

The following is a description of a case where a profile is engraved on a medal or the like by the above-described conventional automatic engraving apparatus using three-dimensional shape data measured by the three-dimensional shape measuring device. In such a case, first, two 3-dimensional shape data are measured by the three-dimensional shape measuring device. As shown in part (A) of FIG. 3, one of the two data is underlay engraving data, and the other is overlay engraving data, which is to be overlaid on the underlay engraving data. The two data are input to an engraving data synthesis processing unit 41, in which after each data has been positioned, synthesis processing is carried out. In the synthesis processing by the engraving data synthesis processing unit 41, the underlay engraving data is first written into the memory, and the overlay engraving data is written over the underlay engraving data to perform updating. Consequently, portions of the underlay engraving data that are overlaid with the overlay engraving data are rewritten and thus concealed. In other words, those portions of the underlay engraving data are erased, and a synthesis result 42 is obtained.

Figure 3B:
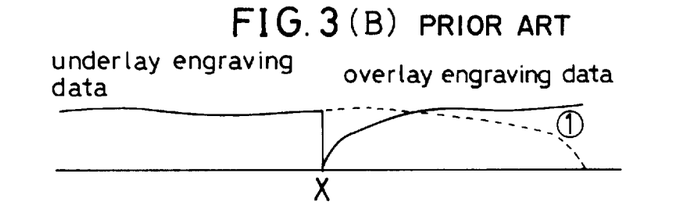

However, when synthesis processing is carried out as stated above, the synthesis result 42 shown in part (A) of FIG. 3 has a Y–Y' section such as that shown in part (B) of FIG. 3, by way of example. That is, the underlay engraving data ① is zero (reference height) at the boundary contour X of the overlay engraving data. Thus, the data becomes discontinuous. When engraving a medal, the three-dimensional cutting machine moves a cutting tool vertically in the direction Z according to the height data while moving the medal in the directions X and Y as stated above. Therefore, when the data is discontinuous as shown in part (B) of FIG. 3, it is impossible to perform cutting while moving the medal at constant speed, and during the cutting process, the movement must be temporarily stopped at the boundary contour X, which forms a step. Accordingly, the cutting efficiency lowers markedly. In addition, because a step is formed on the engraved surface, smooth finish cannot be expected.

Figure 3C:
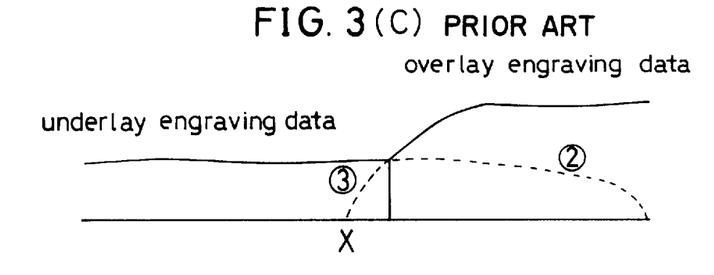

To connect the underlay engraving data and the overlay engraving data smoothly at the boundary, if, as shown in part (C) of FIG. 3, either of the underlay engraving data and the overlay engraving data that is higher than the other is employed and the two data are switched from one to the other at the portions of the same height, that is, if the portions of the same height are defined as a boundary, it is impossible to obtain the contour of the underlay engraving data nor the contour X of the overlay engraving data. In such a case, in particular, the contour X of the overlay engraving data is unfavorably deformed in the synthesis result 42 shown in part (A) of FIG. 3.

DISCLOSURE OF INVENTION

The present invention was made to solve the above-described problems, and an object of the present invention is to enable three-dimensional shape data to be combined together into favorable engraving data and to allow engraving to be performed efficiently on the basis of three-dimensional shape data.

To attain the above-described object, the present invention provides a three-dimensional shape data processor for processing data concerning a three-dimensional shape to be formed on a flat plate. The three-dimensional shape data processor is characterized by having a synthesis processing means for performing synthesis processing such that three-dimensional shape data are partially superimposed on one another, and at an overlap portion, either one of the three-dimensional shape data is left as it is, while the other is erased. The three-dimensional shape data processor further has an interpolation processing means for performing interpolation processing by providing a predetermined interpolation region at a boundary between the three-dimensional shape data subjected to the synthesis processing. The interpolation processing means performs interpolation so that the height changes continuously between the three-dimensional shape data combined together through the interpolation region.

In addition, the present invention provides an engraved plate engraved by moving a cutting blade vertically while moving a flat plate in the directions X and Y on the basis of superimposed three-dimensional shape data. The engraved plate is characterized in that three-dimensional shape data are partially superimposed on one another, and at an overlap portion, either one of the three-dimensional shape data is left as it is, while the other is erased. Moreover, a predetermined interpolation region is provided at a boundary portion between the three-dimensional shape data, and interpolation is performed so that the height of the three-dimensional shape data changes continuously through the interpolation region.

In addition, the present invention provides an engraving apparatus for engraving a flat plate of a noble metal on the basis of three-dimensional shape data. The engraving apparatus is characterized by having a storage means for storing three-dimensional shape data, a holding means for holding the flat plate in a cutting fluid, a cutting means having a cutting blade to perform cutting on the flat plate, and a drive control means for moving the holding means in the directions X and Y and, at the same time, moving the cutting means vertically in the direction Z on the basis of the three-dimensional shape data stored in the storage means. The flat plate is engraved by moving the cutting means vertically in the direction Z while moving the flat plate held in the cutting fluid in the directions X and Y.

BEST MODE FOR CARRYING OUT THE INVENTION

Embodiments of the present invention will be described below with reference to the drawings.

Figure 4:
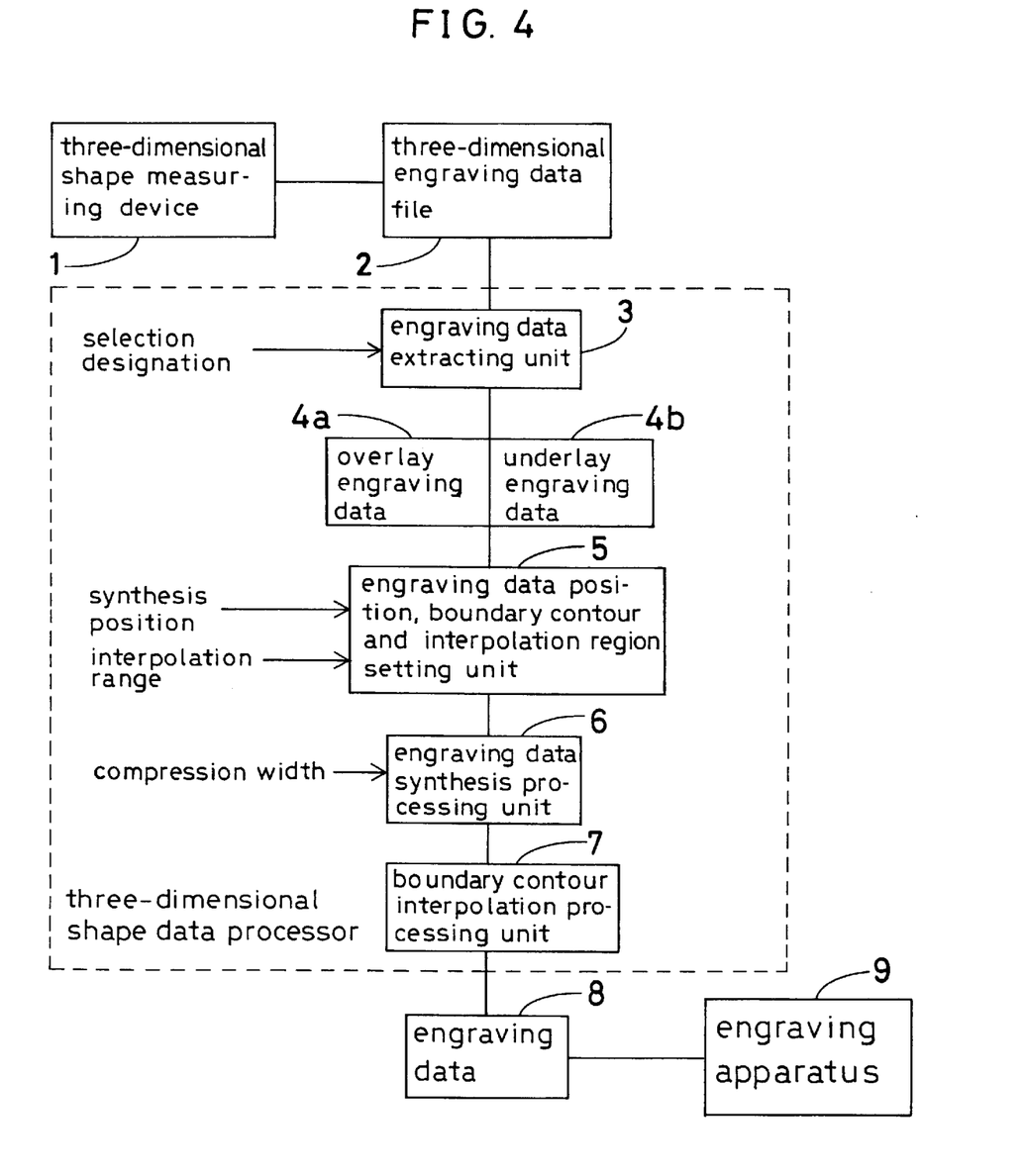
FIG. 4 is a diagram showing an embodiment of a three-dimensional shape data processor according to the present invention.
Figure 5A:
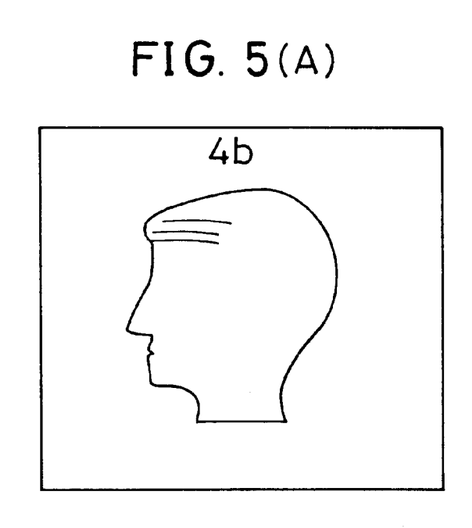
FIG. 5 is a d gram showing an example of superimposition of three-dimensional shape data.
Figure 5B:
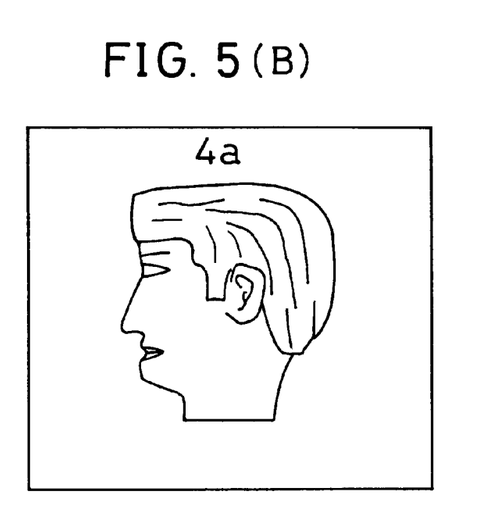
Figure 5C:
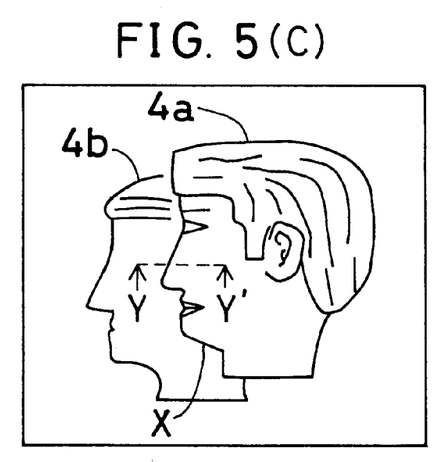
Figure 6A:
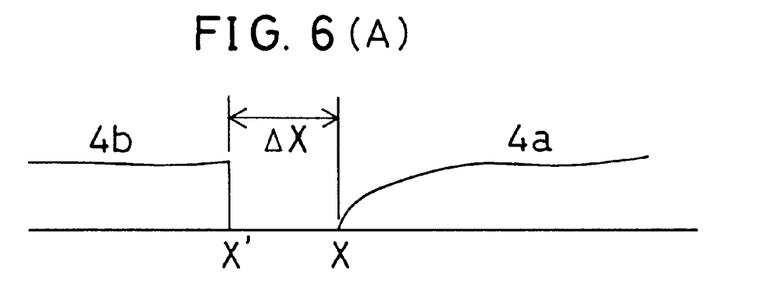
FIG. 6 is a diagram for describing synthesis processing of e-dimensional shape data.
Figure 6B:
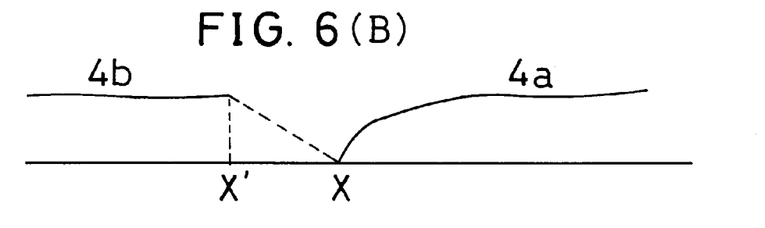
Figure 6C:
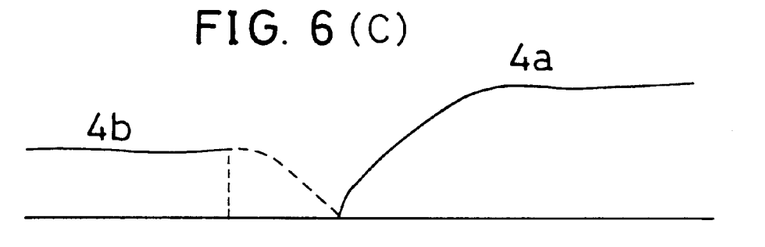
Figure 6D:
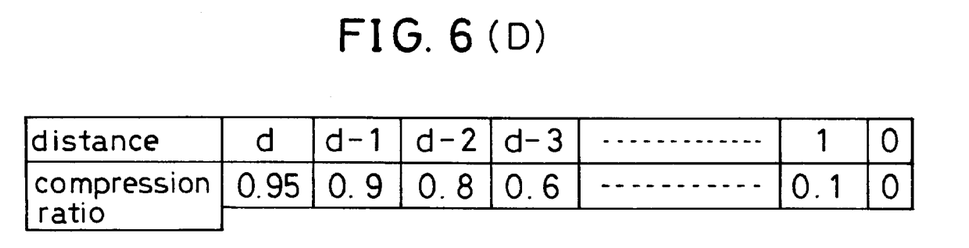

FIG. 4 is a diagram showing an embodiment of a three-dimensional shape data processor according to the present invention. FIG. 5 is a diagram showing an example of superimposition of three-dimensional shape data. FIG. 6 is a diagram for describing synthesis processing of three-dimensional shape data.

In the figures: reference numeral 1 denotes a three-dimensional shape measuring device; 2 denotes a three-dimensional engraving data file; 3 denotes an engraving data extracting unit; 4a denotes overlay engraving data; 4b denotes underlay engraving data; 5 denotes an engraving data position, boundary contour and interpolation region setting unit; 6 denotes an engraving data synthesis processing unit; 7 denotes a boundary contour interpolation processing unit; 8 denotes engraving data; and 9 denotes an engraving apparatus.

In FIG. 4, the three-dimensional shape measuring device measures a three-dimensional shape having a height by two-dimensionally scanning an object using lasers and CCDs as stated above, and outputs three-dimensional shape data having height information for each point in an XY-plane by executing necessary processing such as removal of a noise having abnormal value data and interpolation of data in a missing portion where measured data cannot be obtained. The three-dimensional engraving data file 2 is a file for storing and accumulating the three-dimensional shape data as three-dimensional engraving data. The engraving data extracting unit 3 extracts engraving data from the three-dimensional engraving data stored in the three-dimensional engraving data file 2 on the basis of selection designation, and retains the extracted overlay engraving data 4a and underlay engraving data 4b as two engraving data for synthesizing three-dimensional engraving data.

The engraving data position, boundary contour and interpolation region setting unit 5 sets the position of the underlay engraving data 4b and the position of the overlay engraving data 4a, which is to be superimposed on the underlay engraving data 4b, and further sets a boundary contour of the overlay engraving data 4a superimposed on the underlay engraving data 4b and also an interpolation region therefor on the basis of the set positions. The interpolation region is set extending over a predetermined distance (e.g. a pixel width) from the boundary contour with respect to the underlay engraving data 4b.

The engraving data synthesis processing unit 6 compresses each of the two data to a size conformable to engraving specifications, and superimposes the overlay engraving data 4a on the underlay engraving data 4b in such a manner that portions of the underlay engraving data 4b that are overlaid with the overlay engraving data 4a are erased, together with the portion of the underlay engraving data 4b that lies in the interpolation region, which is set with a predetermined pixel width from the boundary contour.

The boundary contour interpolation processing unit 7 performs interpolation based on the underlay engraving data 4b with respect to the interpolation region, which is set with a predetermined pixel width from the boundary contour of the overlay engraving data 4a superimposed on the underlay engraving data 4b, thereby executing smoothing processing while preserving the boundary contour. The engraving data 8 is, for example, data stored in the memory after the boundary contour interpolation processing. The engraving apparatus 9 is a three-dimensional cutting machine that engraves a medal by moving the medal in the directions X and Y while controlling the height of a cutting blade on the basis of the engraving data.

As stated above, the three-dimensional shape data processor according to the present invention performs smoothing processing for the underlay engraving data 4b over a predetermined width from the boundary contour between the two engraving data, which are to be combined together, with respect to the three-dimensional engraving data file obtained by measurement with the three-dimensional shape measuring device, thereby eliminating the disorder of the contour of the overlay engraving data and thus preventing degradation of the quality. In addition, the synthesized engraving data is prevented from becoming discontinuous at the boundary contour between the overlay engraving data and the underlay engraving data, thereby eliminating problems in cutting. When a medal is made by using only one engraving data instead of using two engraving data combined together, neither of the overlay and underlay engraving data 4a and 4b is used, but single engraving data is used. Consequently, the engraving data position, boundary contour and interpolation region setting unit 5 performs merely setting of position, and the engraving data synthesis processing unit 6 compresses single engraving data to a size conformable to engraving specifications. The compressed engraving data is stored as engraving data 8. At this time, the boundary contour interpolation processing unit 7 is bypassed.

The engraving data synthesizing process will be described below more specifically. For example, to superimpose overlay engraving data 4a shown in part (B) of FIG. 5 on underlay engraving data 4b shown in part (A) of FIG. 5, the position of the overlay engraving data 4a is set with respect to the position of the underlay engraving data 4b as shown in part (C) of FIG. 5. That is, the overlay engraving data 4a is shifted by a desired distance from the underlay engraving data 4b so that about a half of the underlay engraving data 4b is left, for example. Part (A) of FIG. 6 shows a Y–Y' section at the boundary contour between the overlay engraving data 4a and the underlay engraving data 4b, which are shown in FIG. 6. As shown in FIG. 6, an interpolation region ΔX is provided to extend leftward from the boundary contour X of the overlay engraving data 4a as shown in part (C) of FIG. 5, and a portion of the underlay engraving data 4b that is overlaid with the overlay engraving data 4a in a region extending rightward from X', inclusive of the interpolation region ΔX, is erased.

As has been stated above, when the overlay engraving data 4a and the underlay engraving data 4b are compressed and superimposed in conformity to the engraving specifications and thus a portion of the underlay engraving data 4b in the interpolation region is erased from the boundary contour as shown in part (A) of FIG. 6, the boundary contour interpolation processing unit 7 executes interpolation processing so that, as shown in part (B) of FIG. 6, the data changes gradually in the interpolation region from the height of the underlay engraving data 4b to the height of the boundary contour. The interpolation processing prevents the height from becoming discontinuous in a stepwise form in the region extending from the underlay engraving data 4b through the boundary contour to the overlay engraving data 4a. Accordingly, it is possible to continuously perform the operation of the cutting blade in the engraving apparatus 9 and hence possible to increase the cutting efficiency. Thus, it is possible to provide a high-quality medal engraved with smoothly superimposed three-dimensional images.

Part (B) of FIG. 6 shows an example in which smoothing processing by data interpolation in the interpolation region is performed so that the data changes linearly from the height of the underlay engraving data 4b to the height of the boundary contour. It is also possible to effect interpolation for the height by using a curved line as shown in part (C) of FIG. 6. By performing such interpolation, the same synthesis result can be obtained regardless of whether the same compression ratio for the height is used for the overlay engraving data 4a and the underlay engraving data 4b as shown in part (B) of FIG. 6 or the compression ratio for the height of the overlay engraving data 4a is set lower than that of the underlay engraving data 4b as shown in part (C) of FIG. 6 in order to raise one of two faces above the other. In this case, processing may be carried out by using a table containing compression ratios set, as shown in part (D) of FIG. 6, in correspondence to the distances d, d-1, . . . from the boundary contour. It is also possible to carry out arithmetic processing using a function.

Regarding the direction of the overlay engraving data 4a as superimposed, there are cases where it is not placed to face in the same direction as the underlay engraving data 4b as shown in FIG. 5 but in the opposite direction, like a mirror image. That is, there are cases where the overlay engraving data 4a is superimposed to face right in FIG. 5. In such superimposition, a boundary line between the overlay engraving data 4a and the underlay engraving data 4b is usually set in the center; there is no boundary contour. Accordingly, interpolation processing may be carried out by either of the following two methods: a method wherein the boundary line in the center is set to a predetermined reference height, and an interpolation region is set on each side of the boundary line in the same way as the above to perform interpolation processing so that the height changes continuously; and a method wherein an interpolation region is set on one side of the boundary line in the center, and interpolation processing is performed so that the height of the overlay engraving data 4a and the height of the underlay engraving data 4b are continuous with each other in the interpolation region.

Figure 7:
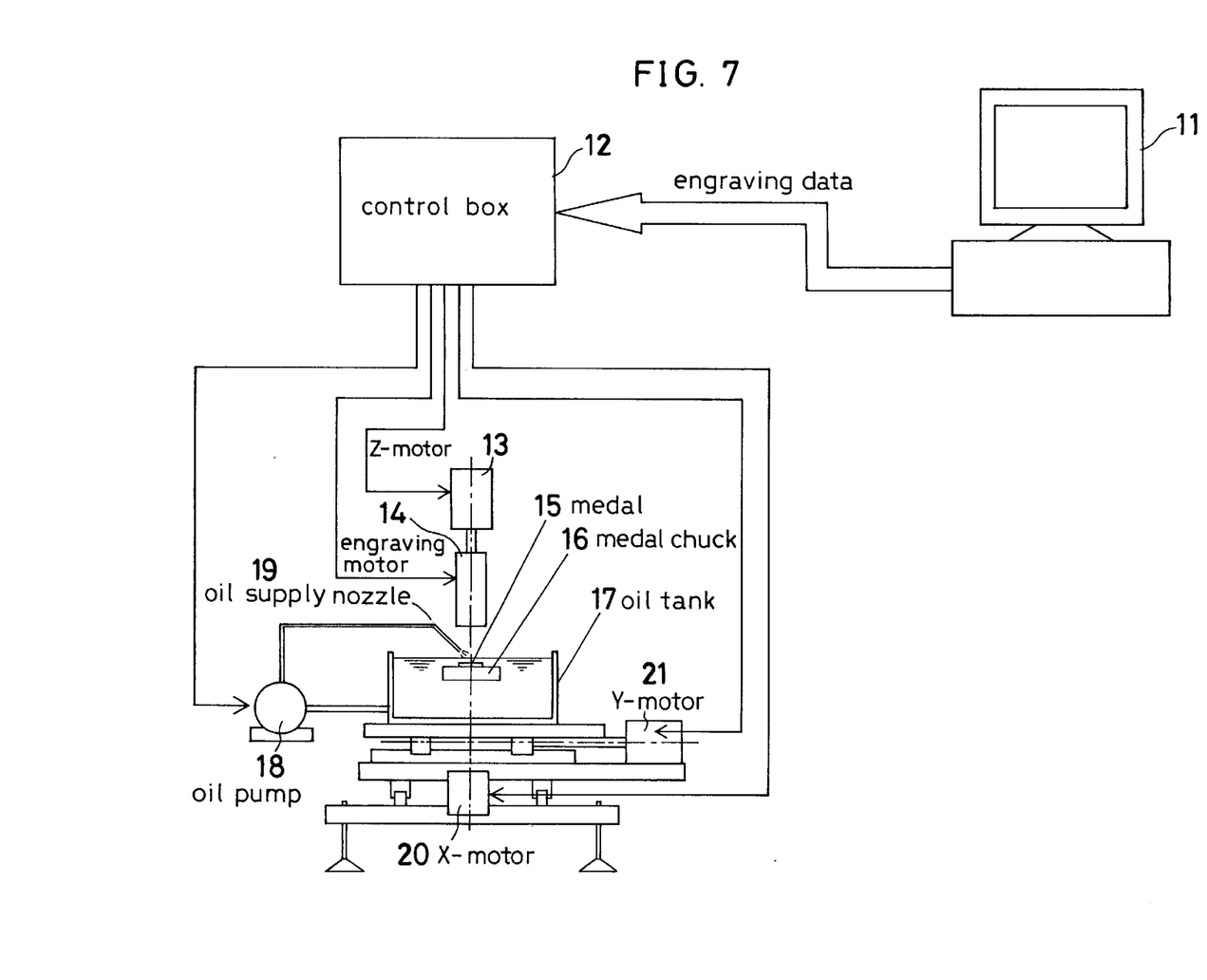
FIG. 7 is a diagram showing an embodiment of an oil-immersion engraving apparatus.

Next, the engraving apparatus will be described. FIG. 7 is a diagram showing an embodiment of an oil-immersion engraving apparatus, and FIG. 8 is a diagram for describing the relationship between the convection of a cutting fluid and the cutting direction. In the figures, reference numeral 11 denotes a three-dimensional shape data processor; 12 denotes a control box; 13 denotes a Z-motor; 14 denotes an engraving motor; 15 denotes a medal; 16 denotes a medal chuck; 17 denotes an oil tank; 18 denotes an oil pump; 19 denotes an oil supply nozzle; 20 denotes an X-motor; 21 denotes a Y-motor; 22 denotes a cutting fluid outlet; 23 denotes a cutting fluid; 24 denotes a cutting fluid circulating system; and 25 denotes a cutting blade.

In FIG. 7, the three-dimensional shape data processor 11 is an apparatus that performs the processing described above with reference to FIG. 4 for three-dimensional engraving data according to engraving specifications. The control box 12 controls various mechanisms of the three-dimensional cutting machine on the basis of engraving data prepared by the three-dimensional shape data processor 11. In the three-dimensional cutting machine, the medal 15 to be engraved is held by the medal chuck 16, and the whole medal 15 is immersed in the cutting fluid in the oil tank 17. While the whole medal 15 is being moved in the directions X and Y, the cutting blade at the upper surface of the medal 15 is moved vertically to effect cutting according to the engraving data. The X-motor 20 moves the medal 15 to be engraved in the direction X together with the medal chuck 16 as one unit, and together with the oil tank 17. The Y-motor 21 moves them in the direction Y at right angles to the direction X. The engraving motor 14 rotates the cutting blade at high speed, e.g. at ten-odd thousand revolutions in the case of a noble metal. The Z-motor 13 moves vertically the cutting blade rotating at high speed. The oil supply nozzle 19 supplies a cutting fluid into the oil tank 17. The oil pump 18 circulates the cutting fluid from the oil tank 17 through the oil supply nozzle 19.

Incidentally, in the case of engraving a medal of a rigid material such as brass or an acrylic material, no particular problem will arise even when the medal is cut in a room atmosphere as in the case of general machine tools and cutting machines. However, in the case of a medal using a noble metal having a low hardness and a low melting point, such as gold, silver, or platinum, cuttings are undesirably deposited on the cutting blade and the surface of the medal during cutting. To solve the problem, the three-dimensional cutting machine shown in FIG. 7 is arranged such that the medal 15 to be engraved, which is held by the medal chuck 16, is immersed in the cutting fluid in the oil tank 17, thereby cooling the cutting blade and cuttings. Furthermore, the cutting fluid in the oil tank 17 is circulated gently by convection through the oil supply nozzle 19 by using the oil pump 18, thus causing cuttings to flow away from the cutting blade, thereby preventing cuttings from gathering in the vicinity of the cutting blade.

In cutting a medal using a noble metal having a low hardness and a low melting point, the medal 15 is immersed in the cutting fluid circulated by convection so that cuttings heated by frictional heat during cutting will not be deposited on the cutting blade and the surface of the medal. In this case, if the oil supply nozzle 19 is positioned close to the edge of the cutting blade to such an extent that the cutting fluid is applied directly to the edge of the blade, the edge of the blade is oscillated, causing the quality of engraving to be degraded. Therefore, the position of the oil supply nozzle 19 is selected so that the oil supply nozzle 19 is placed away from the edge of the blade to a certain extent and thus gentle convection of the cutting fluid is produced at the surface being engraved by the edge of the blade.

Figure 8A:
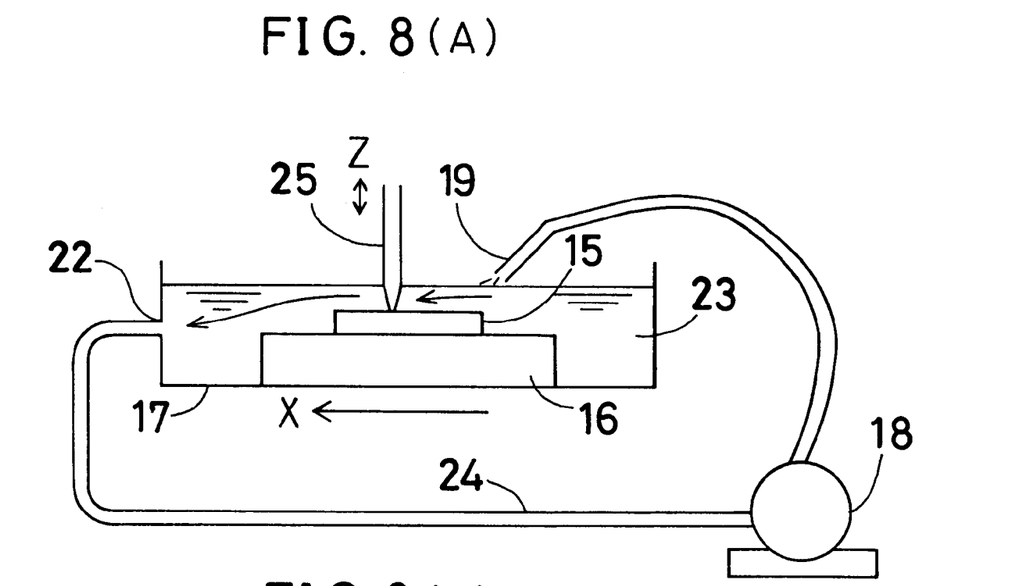
FIG. 8 is a diagram for describing the relationship between the convection of a cutting fluid and the cutting direction.
Figure 8B:
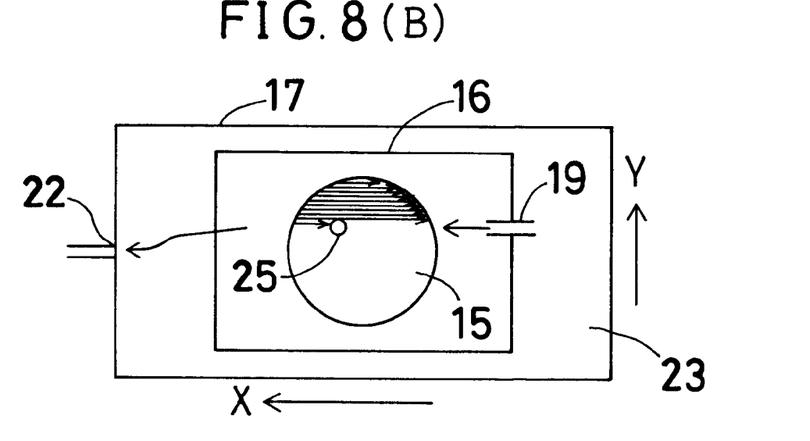

In a case where cutting is effected when the oil tank 17 moves in the direction X as shown in FIG. 18, the oil supply nozzle 19 is positioned forward of the cutting blade 25 in the cutting direction, and the cutting fluid outlet 22 of the oil tank 17 is positioned rearward of the cutting blade 25 in the cutting direction, opposite to the oil supply nozzle 19. In other words, cutting is effected in the direction of the oil supply nozzle 19, and the cutting fluid outlet 22 is provided on the opposite side so that convection of the cutting fluid 23 is counter to the direction in which cutting is performed. By doing so, cuttings flow toward the side where cutting has been completed and are removed. In addition, an effective way of making the convection parallel to the cutting direction as shown in part (B) of FIG. 8 is to secure the oil supply nozzle 19 to the side where the cutting blade 25 is mounted so that the oil supply nozzle 19 is integral with the cutting blade 25.

The positional relationship between the oil supply nozzle 19 and the cutting fluid outlet 22 may be reversed to the above, depending on the material of the medal and the cutting conditions. In this case, cuttings flow in the cutting direction. Therefore, there is no likelihood that the engraved surface immediately after cutting will be made difficult to see by cuttings, in contrast to the above-described layout. Thus, each layout has both advantages and disadvantages. In addition, the oil supply nozzle 19 and cutting fluid outlet 22 may be disposed to face each other at right angles to the cutting direction. It is a matter of course that the oil supply nozzle 19 may be omitted by allowing convection to occur in the oil tank 17 between the starting (rearward) side and the terminating (forward) side in the cutting direction.

It should be noted that the present invention is not limited to the above-described embodiments but can be modified in a variety of ways. For example, in the foregoing embodiments, the present invention has been described as a series of systems in which three-dimensional shape data measured by the three-dimensional shape measuring device is subjected to synthesis processing by the processor, and the resulting engraving data is engraved by the three-dimensional cutting machine. However, the three-dimensional shape measuring device, the three-dimensional shape data processor, and the three-dimensional cutting machine are independent of each other. These devices may be arranged as a series of systems by connecting them to each other with data lines or the like, but the arrangement may also be such that the three-dimensional engraving data file and the engraving data are transferred by using a recording medium such as a memory disk.

Furthermore, although in the foregoing embodiments three-dimensional engraving data measured by the three-dimensional shape measuring device are combined together and used for engraving, the present invention is not limited to the three-dimensional shape data measured by the three-dimensional shape measuring device. The arrangement may be such that height data is obtained from two-dimensional data, e.g. a photograph, by executing predetermined processing, for example, by using empirically set parameters, and the height data thus obtained is used as three-dimensional shape data. It is also possible to use three-dimensional shape data prepared by using computer graphic techniques.

Furthermore, the three-dimensional shape data may be used to engrave not only a medal but also a coin, the face of a clock, a wall decoration flat panel or the like regardless of the use application and the kind of object and also regardless of the shape, e.g. a circular, oval or polygonal shapes and the size. Thus, the three-dimensional shape data may be used not only as engraving data for a medal or the like but also as data for making a die for stamping a passport or the like. Furthermore, not only two but also three or more engraving data may be combined together in the same way as the above. The engraving data may be not only data concerning the human heads but also data concerning the whole body or a combination of the head and the whole body. The present invention may also be applied to data concerning a combination of the human body and a pet or other animal.

Industrial Applicability

As will be clear from the foregoing description, according to the present invention, when three-dimensional shape data are partially superimposed on one another, at an overlap portion, either one of the three-dimensional shape data is left as it is, while the other is erased, thereby effecting synthesis processing. In addition, a predetermined interpolation region is provided at a boundary between the three-dimensional shape data subjected to the synthesis processing, and interpolation is performed so that the height changes continuously between the three-dimensional shape data combined together. Therefore, no step is produced in the synthesized joint portion. Accordingly, when a medal or the like is engraved, the engraved surface can be finished smoothly. Moreover, because interpolation is effected with the boundary contour left as it is, it is possible to provide a favorable engraved medal or the like free from deformation of the contour. In addition, because three-dimensional shape data are combined together with different compression ratios for the height, it is possible to further enhance the three-dimensional effect of the synthesized engraved image.

In the engraving apparatus for engraving a flat plate of a noble metal on the basis of three-dimensional shape data, a flat plate to be engraved, e.g. a medal, is held in a cutting fluid, and in this state, the flat plate is moved in the directions X and Y. While doing so, the flat plate is engraved by moving the cutting means vertically in the direction Z. Therefore, even in the case of a noble metal having a low hardness and a low melting point, it is possible to prevent cuttings from clinging and depositing on the cutting blade or the cut portion, which would otherwise cause the engraved surface to be disordered. Accordingly, it is possible to provide an engraved plate finished even more excellently.

What is claimed is:

1. A three-dimensional shape data processor for processing data concerning a three-dimensional shape to be formed on a flat plate, said three-dimensional shape data processor comprising:

synthesis processing means for performing synthesis processing such that three-dimensional shape data are partially superimposed on one another, and at an overlap portion, either one of the three-dimensional shape data is left as it is, while an interpolation region from a boundary contour is provided, and synthesis processing is performed by erasing the other of the three-dimensional shape data; and interpolation processing means for performing interpolation processing of said interpolation region of the three-dimensional shape data processed by the synthesis processing; whereby;

said interpolation processing means interpolates in such manner that a height changes continuously between the three-dimensional shape data synthesized through said interpolation region.

2. A three-dimensional shape data processor according to claim 1, wherein said synthesis processing means leaves the one of the three-dimensional shape data as far as a boundary contour, and said interpolation processing means interpolates said interpolation region so that the height changes continuously from a height of the other three-dimensional shape data to a height of said boundary contour.

3. A three-dimensional shape data processor according to claim 2, wherein said synthesis processing means combines together said three-dimensional shape data in such a manner that a compression ratio for height of said one three-dimensional shape data is lower than that of the other three-dimensional shape data.

4. An engraved plate engraved by moving a cutting blade vertically while moving a flat plate in directions X and Y on the basis of superimposed three-dimensional shape data, wherein three-dimensional shape data are partially superimposed on one another, and at an overlap portion, either one of the three-dimensional shape data is let as it is, while an interpolation region from a boundary contour is provided, and the other of the three-dimensional shape data is erased; and interpolation is performed so that a height of the three-dimensional shape data changes continuously through said interpolation region, and engraving is performed.

5. An engraved plate according to claim 4, wherein the one of the three-dimensional shape data is left as far as a boundary contour, and interpolation is performed so that the height changes continuously in said interpolation region from a height of said boundary contour to a height of the other three-dimensional shape data.

6. An engraved plate according to claim 5, wherein said three-dimensional shape data are combined together in such a manner that a compression ratio for height of said one three-dimensional shape data is lower than that of the other three-dimensional shape data.

* * * * *